United States Patent [19]

Lewis et al.

[11] Patent Number: 5,537,464
[45] Date of Patent: Jul. 16, 1996

[54] METHOD AND APPARATUS FOR THE BILLING OF VALUE-ADDED COMMUNICATION CALLS

[76] Inventors: C. Alan Lewis, P.O. Box 214, Pebble Beach, Calif. 93953-0214; D. Kelley Daniels, P.O. Box 233, Tualahn, Oreg. 97062-0233

[21] Appl. No.: 146,887

[22] Filed: Nov. 2, 1993

[51] Int. Cl.$^6$ .............................. H04M 15/00; H04M 3/42
[52] U.S. Cl. ..................... 379/114; 379/112; 379/115; 379/127; 379/211; 379/201
[58] Field of Search ................................. 379/111, 112, 379/113, 114, 115, 116, 121, 122, 144, 219, 220, 221, 201, 127, 211

[56] References Cited

U.S. PATENT DOCUMENTS

| | | | |
|---|---|---|---|
| 4,191,860 | 3/1980 | Weber | 379/221 X |
| 5,008,929 | 4/1991 | Olsen et al. | 379/112 |
| 5,146,491 | 9/1992 | Silver et al. | 379/114 |
| 5,148,474 | 9/1992 | Haralambopoulos et al. | 379/114 X |
| 5,179,584 | 1/1993 | Tsumura | 379/114 |
| 5,184,345 | 2/1993 | Sahni | 379/114 X |
| 5,272,749 | 12/1993 | Masek | 379/211 X |
| 5,343,517 | 8/1994 | Bogart et al. | 379/221 X |

*Primary Examiner*—Stephen Chin
*Assistant Examiner*—Paul Loomis
*Attorney, Agent, or Firm*—LaRiviere, Grubman & Payne

[57] ABSTRACT

New use of the existing PSTN for capturing data to charge enhanced service provider (ESP) fees on phone bills of numbers terminating calls originated by dialing seven digit 555 numbers. The local exchange performs the digit analysis and translation before routing the call to an ESP. The Local Exchange Carrier translates a caller-dialed 7-digit 555 number into a ten-digit phantom number and then passes the call to the appropriate carrier assigned the ten-digit routing plan. The translation function is performed as a look-up in an appropriate database such as the Service Management System (SMS). Heretofore, the SMS was used for ten-digit 800-number translation and was not available to ESP. This novel use of PSTN facilities enables the system to provide caller dialed number and billing information on a real-time basis (during call processing). It is based on signaling the billing and caller dialed number information in the voice channel (In-Band Signaling) during the setup of calls to connecting carriers. The ESPs receive the circuit "off-hook" signal (seizure), receive two fields of Multi-Frequency Tones, then process the information to collect and validate the billing information needed to deny the call or to accept it. If the ESP accepts the call, the caller dialed information is processed to bill the subscriber for access to the particular service the caller selected. Using the available network signaling circuits that exist between the Local Exchange Carriers and the toll carriers in a manner similar to 800 call processing allows the billing information to remain intact through-out the hand-off from the carriers to the ESP.

26 Claims, 15 Drawing Sheets

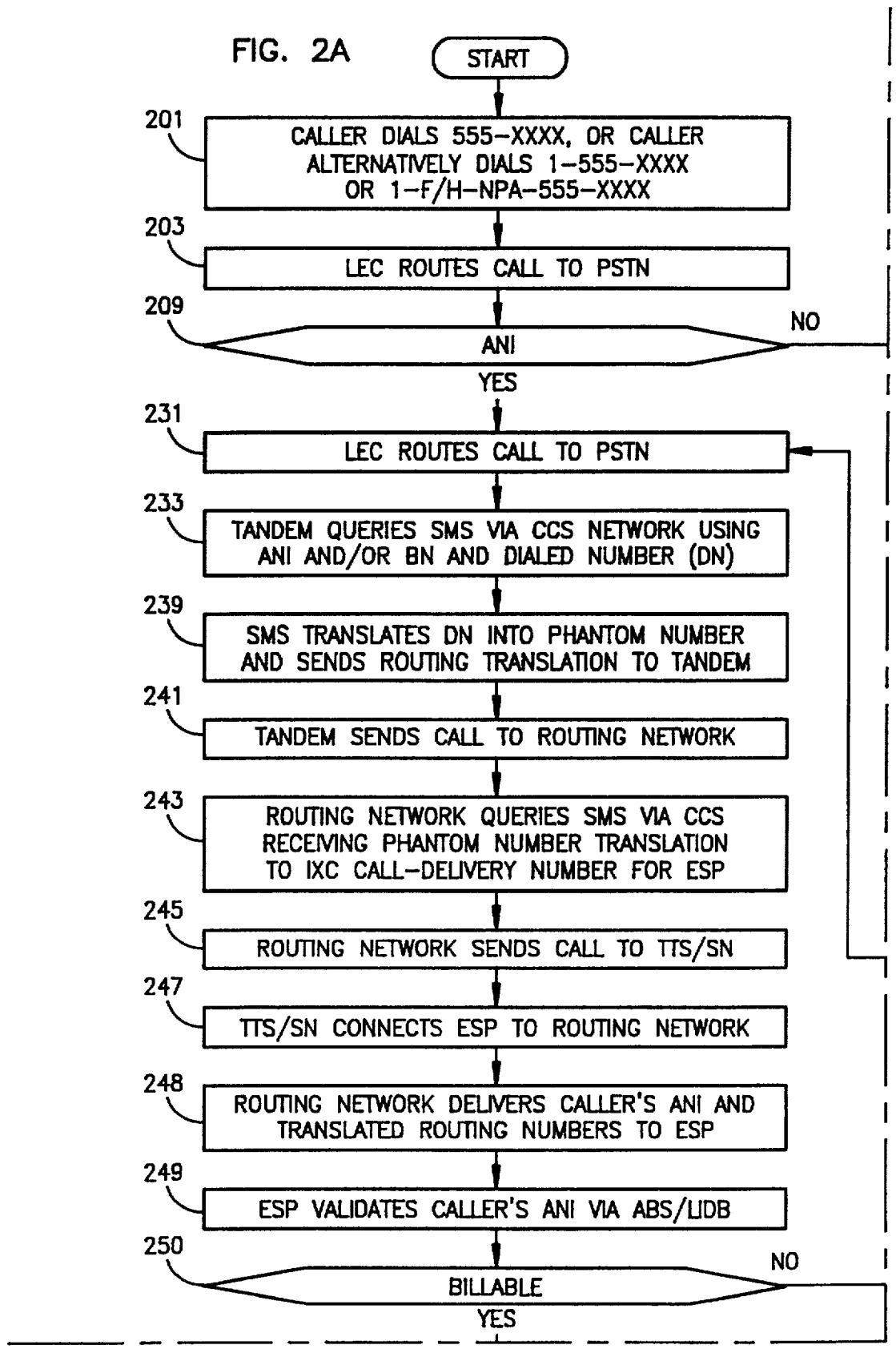

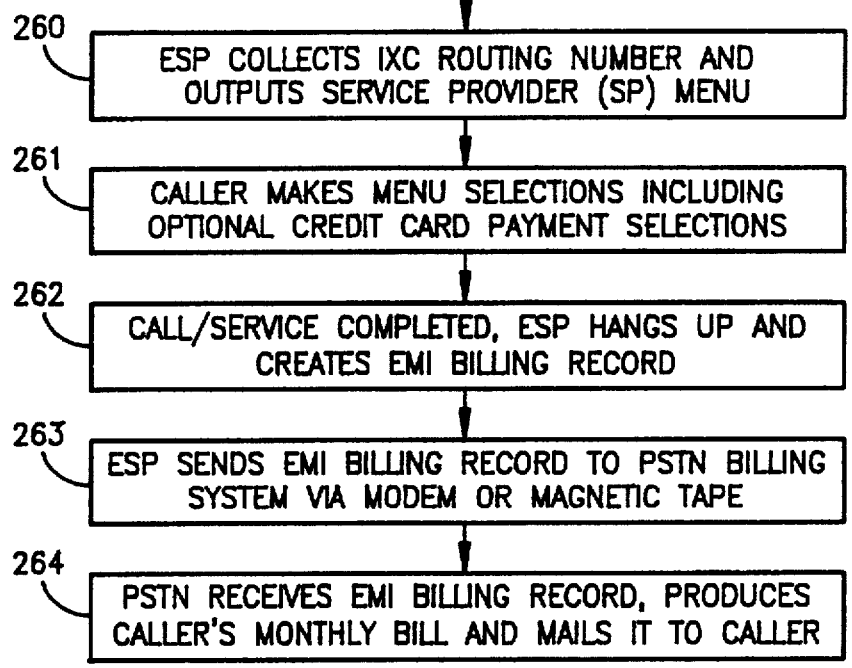
FIG. 2C
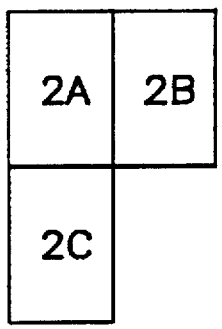

FIG. 4

ESP BILLING RECORD

|     | RECORD IDENTIFICATION |
| --- | --- |
| 431 | DATE OF CALL |
|     | CALLING NUMBER |
|     | DIALED NUMBER |
|     | FREE PERIOD LENGTH |
|     | INITIAL PERIOD LENGTH |
|     | INITIAL PERIOD RATE |
|     | ADDITIONAL PERIOD LENGTH |
|     | ADDITIONAL PERIOD RATE |
|     | RATE MODIFIER |
| 421 | AMOUNT OF CHARGE |
| 422 | CONNECT TIME |
| 432 | ELAPSED TIME |
|     | METHOD OF RECORDING |
|     | RETURN CODE FROM REGIONAL ACCOUNTING OFFICE |
| 423 | SERVICE NAME/TEXT CODE |
| 424 | RATE PERIOD/CLASS |
| 425 | MESSAGE TYPE |
| 426 | INDICATORS |
|     | SERIAL NUMBER |
|     | BILLING RAO |
| 429 | BILLING TELEPHONE NUMBER |
|     | CALLER LOCATION GEOGRAPHIC NAME |
|     | ESP PRODUCT NAME |
|     | LIBRARY SETTLEMENT/CARRIER CODE |
|     | RE-RATE INFORMATION |
|     | INDICATORS |
|     | LOCAL BILLING COMPANY INFORMATION MODULE |
| 427 | TYPE OF ADDITIONAL CHARGE |
| 428 | AMOUNT OF ADDITIONAL CHARGE |

FIG. 5A

BILLABLE MESSAGE
NORTH AMERICAN ORIGINATED, TERMINATED AND BILLABLE
SPECIALIZED SERVICE/SERVICE PROVIDER CHARGE

RECORD NAME

01

CATEGORY

| POS. | FIELD DESCRIPTION | | | CHAR. |
|---|---|---|---|---|
| 1 | CATEGORY | RECORD IDENTIFICATION | | 9 |
| 2 | | | | |
| 3 | GROUP | | | |
| 4 | | | | |
| 5 | RECORD TYPE | | | |
| 6 | | | | |
| 7 | YEAR | DATE OF RECORD | | 9 |
| 8 | | | | |
| 9 | MONTH | | | |
| 10 | | | | |
| 11 | DAY | | | |
| 12 | | | | |
| 13 | FROM NUMBER LENGTH | | | 9 |
| 14 | | | | |
| 15 | NPA | FROM NUMBER | FROM BASE STATION NUMBER | 9 |
| 16 | | | | |
| 17 | | | | |
| 18 | NXX | | | |
| 19 | | | | |
| 20 | | | | |
| 21 | LINE NUMBER | | | |
| 22 | | | | |
| 23 | | | | |
| 24 | | | | |
| 25 | OVERFLOW DIGITS | | | 9 |
| 26 | | | | |
| 27 | | | | |
| 28 | TO NUMBER LENGTH | | | 9 |
| 29 | | | | |

| Byte | Field | | | |
|---|---|---|---|---|
| 30 | NPA | | | 9 |
| 31 | | | | |
| 32 | | | | |
| 33 | NXX | TO NUMBER | TO BASE STATION NUMBER | 9 |
| 34 | | | | |
| 35 | | | | |
| 36 | LINE NUMBER | | | |
| 37 | | | | |
| 38 | | | | |
| 39 | | | | |
| 40 | $ | CHARGE OR AMOUNT COLLECTED | | 9 * |
| 41 | | | | |
| 42 | | | | |
| 43 | | | | |
| 44 | ¢ | | | |
| 45 | | | | |
| 46 | MILL | | | |
| 47 | RESERVED | | | 9 * |
| 48 | $ | STATE TAX | $ OTHER LINE/ SURCHARGE ¢ | $ TOTAL MODULE TAX AND SURCHARGE ¢ | 9 * |
| 49 | | | | |
| 50 | ¢ | | | |
| 51 | | | | |
| 52 | $ | LOCAL TAX | WATS CLASS ORIG WATS BAND | |
| 53 | ¢ | | | |
| 54 | | | | |
| 55 | HR | CONNECT TIME | | 9 |
| 56 | | | | |
| 57 | MIN | | | |
| 58 | | | | |
| 59 | SEC | | | |
| 60 | | | | |
| 61 | MIN | BILLABLE OR REPORTED TIME | | 9 |
| 62 | | | | |
| 63 | | | | |
| 64 | | | | |
| 65 | SEC | | | |
| 66 | | | | |
| 67 | 1/10 | | | |

FIELD CHARACTERISTIC

9 = NUMERIC
X = ALPHANUMERIC

<u>01</u>
GROUP

| POS. | FIELD DESCRIPTION | | CHAR. | |
|---|---|---|---|---|
| 68 | METHOD OF RECORDING | | 9 | |
| 69 | | | | |
| 70 | RETURN CODE | CANCEL CODE | 9 | |
| 71 | | | | |
| 72 | FROM RAO | | 9 | |
| 73 | | | | |
| 74 | | | | |
| 75 | RESERVED | | 9 | * |
| 76 | | | | |
| 77 | SERVICE NAME/SERVICE TEST CODE IND. | | 9 | * |
| 78 | RATE PERIOD | | 9 | |
| 79 | RATE CLASS | | 9 | |
| 80 | MESSAGE TYPE | | 9 | |
| 81 | IOC CODE | TERM. WATS BAND | 9 | |
| 82 | 1 | | | |
| 83 | 2 | | | |
| 84 | 3 | | | |
| 85 | 4 | | | |
| 86 | 5 | | | |
| 87 | 6 | | | |
| 88 | 7 | | | |
| 89 | 8 | | | |
| 90 | 9 | | | |
| 91 | 10 | INDICATORS | 9 | |
| 92 | 11 | | | |
| 93 | 12 | | | |
| 94 | 13 | | | |
| 95 | 14 | | | |
| 96 | 15 | | | |
| 97 | 16 | | | |
| 98 | 17 | | | |
| 99 | 18 | | | |
| 100 | 19 | | | |
| 101 | 20 | | | |

| | | | | | | |
|---|---|---|---|---|---|---|
| 102 | | OPERATOR UNIT | | | | |
| 103 | | | | | | |
| 104 | | RECORDING POINT IDENTIFICATION (AMA) | | SERIAL NUMBER | | 9 |
| 105 | | | | | | |
| 106 | | | | | | |
| 107 | | | | | | |
| 108 | | | | | | |
| 109 | | | | | | |
| 110 | | BILLING RAO | | | | 9 |
| 111 | | | | | | |
| 112 | | | | | | |
| 113 | | BILLING NUMBER NORTH AMERICAN STANDARD | | BILLING NUMBER NON STANDARD | | X |
| 114 | | | | | | |
| 115 | | | | | | |
| 116 | | | | | | |
| 117 | | | | | | |
| 118 | | | | | | |
| 119 | | | | | | |
| 120 | | | | | | |
| 121 | | | | | | |
| 122 | | | | | | |
| 123 | | COIN TARIFF AMT | NORTH AMER. FROM PLACE | OVER- SEAS FROM PLACE AND COUN- TRY | FROM SHIP NAME | CDAR NO. |
| 124 | $ | | | | | |
| 125 | | | | | | |
| 126 | ¢ | | | | | |
| 127 | | | | | | |
| 128 | $ | COIN FED TAX | | | | |
| 129 | | | | | | X |
| 130 | ¢ | | | | | |
| 131 | | | | | | PSEUDO TRUNK NO. (SFG) |
| 132 | | SSAS CODE | N.A. FROM STATE | | | |
| 133 | | | | | | |
| 134 | | CnCrCd. | | | | |

| POS. | FIELD DESCRIPTION | | CHAR. |
|---|---|---|---|
| | 18 | | |
| | RECORD TYPE | | |
| 135 | SERVICE NAME | SERVICE TEXT CODE | X * |
| 136 | | | |
| 137 | | | |
| 138 | | | |
| 139 | | | |
| 140 | | | |
| 141 | | | |
| 142 | | | |
| 143 | | | |
| 144 | | | |
| 145 | | | |
| 146 | | | |
| 147 | LIBRARY CODE | | X |
| 148 | | | |
| 149 | SETTLEMENT CODE | | X |
| 150 | CARRIER IDENTIFICATION | | 9 |
| 151 | | | |
| 152 | | | |
| 153 | RERATE INFORMATION | | 9 |
| 154 | | | |
| 155 | | | |
| 156 | | | |
| 157 | | | |
| 158 | 21 | INDICATORS | 9 |
| 159 | 22 | | |
| 160 | 23 | | |
| 161 | 24 | | |
| 162 | 25 | | |
| 163 | 26 | | |
| 164 | 27 | | |
| 165 | 28 | | |
| 166 | 29 | | |
| 167 | 30 | | |

FIG. 6

RECORD DESCRIPTION

| 01 | 01 | 18 |
|---|---|---|
| CATEGORY | GROUP | RECORD TYPE |

CATEGORY 01: BILLABLE MESSAGE

GROUP 01: NORTH AMERICAN ORIGINATED, TERMINATED AND BILLABLE

REC. TYPE 18: SPECIALIZED SERVICE/SERVICE PROVIDER CHARGE

USE OF RECORD:

THIS RECORD IS USED TO BILL CHARGES ASSOCIATED WITH A MISCELLANEOUS SERVICE FOR WHICH NO OTHER RECORD TYPE HAS BEEN DEFINED.

| HEADERS/TRAILERS: | CMDS: | LOCAL: |
|---|---|---|
| 20-20-01/02 | Y | Y |
| 20-21-01/02 | N | Y |
| 20-22-01/02 | Y | Y |
| 20-22-03/04 | Y | Y |

SPECIAL CONSIDERATIONS:

- THE "SERVICE NAME/SERVICE TEXT CODE INDICATOR" IS IN POSITION 77. THIS INDICATOR DESIGNATES WHETHER THE RECORD CONTAINS A "SERVICE NAME" OR A "SERVICE TEXT CODE".

- THE "SERVICE NAME" IS IN POSITIONS 135-146.

- THE "SERVICE TEXT CODE" IS IN POSITIONS 135-139.

METHOD AND APPARATUS FOR THE BILLING OF VALUE-ADDED COMMUNICATION CALLS

FIELD OF THE INVENTION

The present invention relates to telephone systems and, more particularly, to a new billing and collection system employing the dialing of the 555 information numbering group for Enhanced Service Providers.

BACKGROUND OF THE INVENTION

Processing of telephone calls in the Public Switched Telephone Network (PSTN) in the United States is controlled by two entities: Local Exchange Carriers (LEC), and toll carriers or interexchange carriers (IXCs). LECs process calls to and from their local telephone subscribers, while IXCs process calls for callers who are dialing long distance. There are approximately 1,400 LECs, and 700 IXCs. The terms "LEC" and "IXC" are beginning to be replaced by the terms "AP" and "AC". "AP" means Access Providers, and is synonymous with "LEC". "AC" means Access Customers, and is synonymous with "IXC".

In recent years, additional telephone-delivered services are being provided by entities referred to as Information Providers (IP). The IP industry was born in 1980 when AT&T (American Telephone and Telegraph Co.) and American Broadcasting Corporation established a telephone line to receive "votes" on the winner of a presidential debate between Jimmy Carter and Ronald Reagan. Enterprising entrepreneurs soon began to exploit the business potential of these new telephone lines. An IP is a business entity that provides services that supplement the plain local and long distance telephone service provided by the LECs and the IXCs. The services provided by an IP are paid for by the telephone caller or subscriber, usually on a pay-per-call basis. Typically, the subscriber dials an IP number having a 900 or a 976 area code, and the charges appear on the subscriber's telephone bill by way of a system known as a Billing and Collection (B&C) system. Typically, services provided by the pay-per-call IPs are in the nature of "audiotex" information supplied in response to voice-mail-style accessing. In addition to taking public-opinion polls, pay-per-call IPs may provide information on a wide variety of subjects such as: psychic hotline readings, sports information, entertainment information, and the like.

A well known problem plaguing the IP industry is the taint associated with calling a 900 number. The 900/976 pay-per-call B&C system has suffered widespread public-image damage through past abusive use by unscrupulous and/or pornography-peddling IPs. Therefore, the Federal Communities Commission (FCC) has mandated that any business or residential subscriber refusing to pay a 900/976 charge cannot have their phone service disconnected, and may order their phone service blocked from initiating calls to these prefixes.

These developments have resulted in problematic availability of certain billing/account information needed to charge callers for delivery of value-added service.

Another result is that Service Providers (SPs) cannot receive a totally nationwide ("ubiquitous") generic connection from any carrier which contains the information that SPs need to process the call during set up, (i.e., in real-time) in order to prevalidate the billing information as a prerequisite to terminating the call as unbillable, or continuing the call as billable and provide a revenue-generating value-added service.

Further, in order to limit services to only those telephone subscribers for whom service fees can be charged to the subscriber's telephone bill, service requests made from a pay phone, a prison, a hospital, a hotel, or other such "non-billable" telephone subscriber must be sent a message that the request cannot be fulfilled. There is a two-digit code that identifies these non-billable telephone facilities which permits call interruption to avoid creating an un-collectible transaction. Thus, billing information and called number information must be delivered to the SP during call processing and in one transaction. The PSTN does not fulfill this requirement because the LECs and IXCs each possess incomplete information which cannot currently be made complete by SPs due to the circuits being separate and therefor unable to transport the needed information to the SPs through the IXC's network.

Another problem that presented itself was that upon examination of possible sub-circuit designs deployable at the discretion of a LEC, it was learned that any sub-circuit design deployed through one LEC within the PSTN will not be ubiquitous throughout the network, i.e., deployment would need to be negotiated with each individual LEC to gain access to all portions of the network. Thus, there is a need for a sub-circuit design for SP use of 555 numbers deployable through just one IXC to gain national access to the PSTN that is also free from any requirement for Integrated Service Digital Network (ISDN) or other parallel circuit such as that shown in U.S. Pat. No. 5,003,584 to Benyacar et al.

Accordingly, there is a need for a new discrete dialed-number segment and a new value-added B&C signaling system for use only by reputable Service Providers (SP) such as responsible business and professional organizations. These organizations need to provide on-demand access to product/service information by their associates and clients on a "fee-for-service-rendered" basis, with applicable service charges added to the service-recipient's phone bills.

The present invention is the result of ten months of research and development to devise a way to open a new segment of the telephone circuit to an SP sensitive to, and wishing to avoid the "guilt by association" stigma of using 900/976 numbers. The research encompassed examination of all telephone industry systems and tariffs, both existing and planned.

During the research, it was discovered that an industry group called the 555-XXXX Line Number Guidelines Task Group, is in the process of opening the 555-group for number assignments to SP businesses in addition to the traditional 555-1212 use for telephone-number look-up. This task group is preparing a document entitled "555-NXX Assignment Guidelines, Document No. ICCF-XX-XXXX-XXX", of which the most current draft is dated Oct. 29, 1993. Historically, telephone-number look-up services evolved from similar-but-separate functions of the LEC networks. Therefore, the 555-number system lacks nationwide ("ubiquitous") signaling of B&C information from one LEC to another. When 555-1212 calls were processed, generally only a peg count or tally of the calls (no call length) was kept by the local end office, and the tally was not transmitted to the far end. Consequently, it was obvious to the present inventors that any national SP use of the 555-number group in the Public Switched Telephone Network (PSTN) would require a new B&C sub-circuit design. Nationwide deployment of any new B&C sub-circuit design within the PSTN circuit, as mandated by the Federal Communications Commission (FCC) Open Network Architecture (ONA) could be accomplished only through each and every one of the 1400 LECs, or, conversely, through only one of the 700 IXCs.

AT&T (American Telephone & Telegraph Co.) has patented a technology that is referred to as MultiQuest in U.S. Pat. No. 5,187,710. It is for use by 900/976 number service providers at only those locations licensed and equipped to use AT&Ts ISDN (Integrated Services Digital Network) Primary Rate Interface. A service of MultiQuest, trademarked Vari-A-Bill, is an addition to ISDN capabilities. The Vari-A-Bill system allows the licensee's equipment to signal price changes to the AT&T network over a separate channel while a call to the 900-number is in progress. Five flexible options may be invoked: 1.) Free call. No charge for the entire call. 2.) Flat Charge. The price of the call is fixed at a set fee. 3.) New Rate. The per minute rate can be changed upward and downward. 4.) Premium charge. This would be a flat charge added to the per minute rate. 5.) Premium credit. This refers to a flat amount to be deducted from the total price of the call. The total price would not go below $0.

Heretofore, without ISDN or the teachings found in Benyacar, U.S. Pat. No. 5,003,584, the needed billing account information was only able to be assembled from several disparate sources after the call was completed (too late to deny unbillable services.).

DISCLOSURE OF INVENTION

In accordance with the present invention, there is provided means for assembling and signaling the billing information and caller-dialed-number information to the ESP in the voice channel during call setup to connecting carriers. The ESP is able to utilize the billing information and the caller-dialed-number information for making the decision to deny a call requesting the service information. This enables the ESP to limit services to only those callers for whom service fees can be charged to the caller's telephone bill.

A novel feature of this invention is the method of establishing a bridge-circuit between the call-originating LEC 7-digit dialing side of the PSTN routing system, and the disparate long-distance call-delivery IXC 10-digit dialing side. The bridge-circuit enables a 7-digit call (i.e., 555-XXXX) to be delivered, complete with caller identification (ID) and call billing information, across the PSTN as though it were a 10-digit number (i.e., 800-XXX-XXXX).

A bridge-circuit is required to permit a value-added enhanced SP to use a locally-dialable 7-digit 555-XXXX number in a nationwide (i.e., ubiquitous) application. The SP needs the call billing information during call set up (i.e., in real-time) to be able to terminate unbillable calls prior to providing any service.

An SP orders a locally dialable 7-digit number designated for national deployment, and subsequently orders an unpublished 10-digit number from an IXC, for which no end-user equipment connection is ordered. The 10-digit number becomes a phantom number (PN) unable to be direct-dialed by an end user. The bridge-circuit is established when the SP orders software "pointers" to the PN installed in the PSTN Service Management System (SMS) data base useful for, among other applications, storing records to be accessed in routing calls from an originating call switch (i.e., LEC) to a terminating toll switch (TTS).

In operation, when a caller dials an SP's nationally deployed 7-digit number through the LEC, the LEC queries its side of the SMS that points the query to the PN, and the SMS sends the PN's call-routing instructions back to the LEC. The LEC then delivers the call, the caller ID, and the LEC routing instructions to the routing network. The routing network in turn queries its side of the SMS that points the query to the PN, and the SMS sends the PN's assigned terminating toll switch (TTS) and ESP location identification back to the routing network; whereupon the routing network sends the call, and the caller ID to the ESP through the Inband Equal Access Signaling Interface (IEASI) in a manner synonymous with, but not requiring, Presubscription in accordance with the Federal Communications Commission (FCC) mandated Open Network Architecture (ONA).

BRIEF DESCRIPTION OF THE DRAWING

In the drawing,

FIG. 4 lists the data fields of the ESP billing records;

FIG. 6 is a typical Record Description form used with the billing record of FIG. 5.

GENERAL DESCRIPTION

Figure 1A:
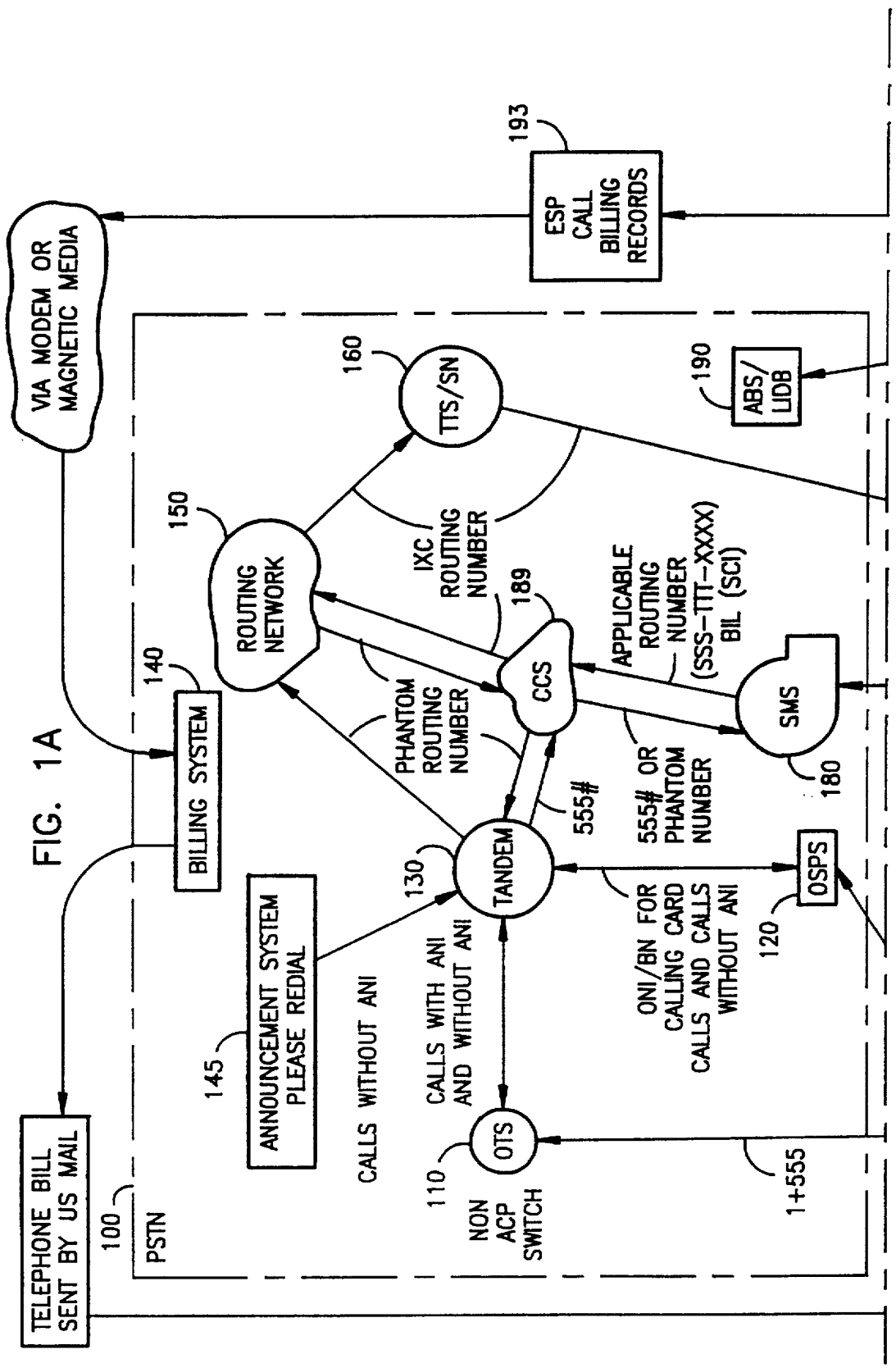
FIG. 1 shows, in block diagram form, an illustrative PSTN useful in describing the operation of the present invention.
Figure 1B:
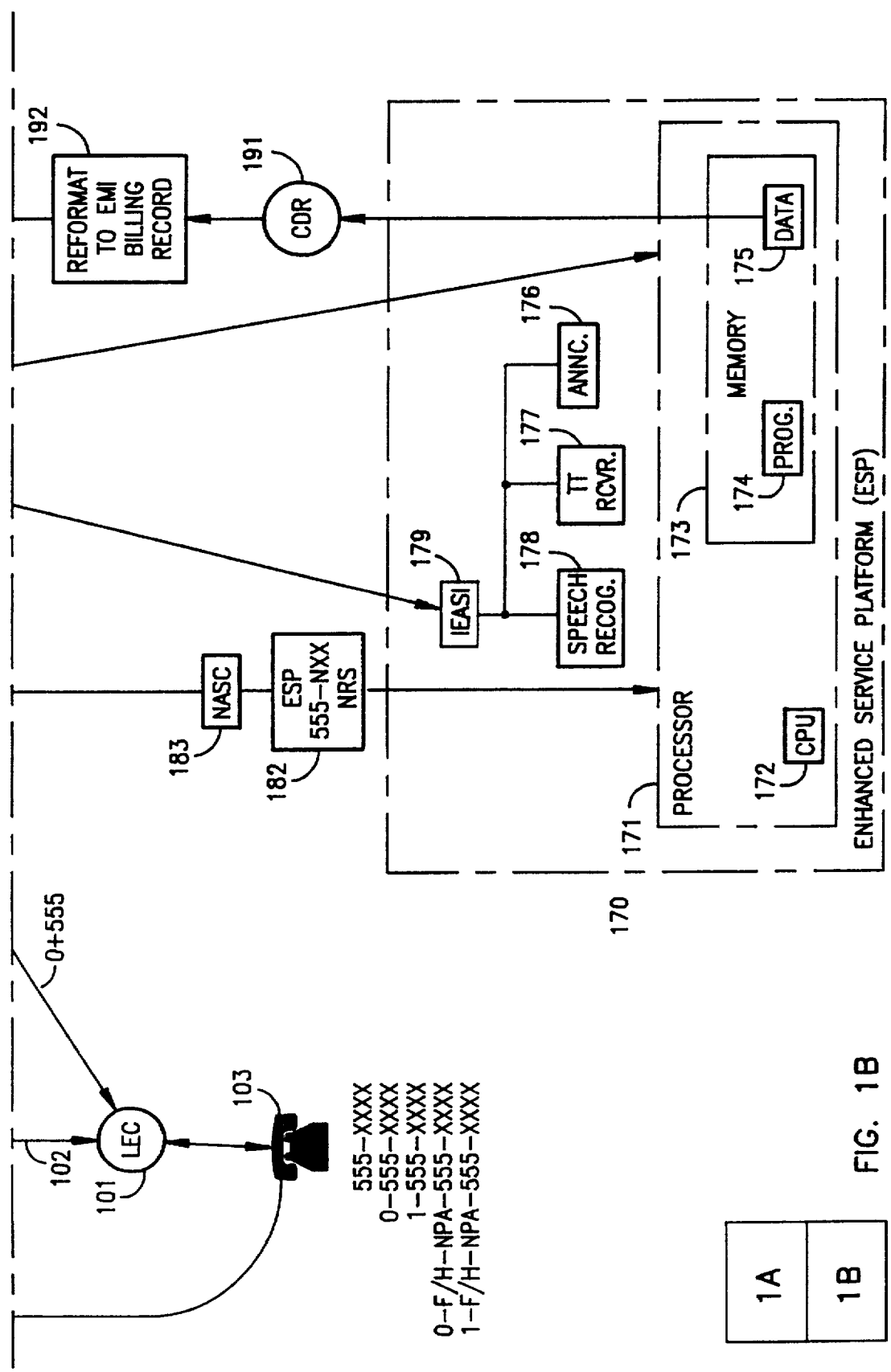

Preceding delineation of the operating description of the inventive method and apparatus for billing value-added communication calls, it is important to note that the apparatus and method of the invention is compatible with all known variations of telco-supplier equipment currently in use within the PSTN configuration shown in FIG. 1. Since the various systems shown in FIG. 1 utilize a variety of hardware and programming techniques, no attempt is made to describe the existing programs used to control these various systems. However, using the following description as a guide, the operations of the present invention should be integrated into the control structure of the various systems of FIG. 1, and function compatibly with other features and operations of those systems. Thus, in order to avoid confusion and enable those skilled in the art to practice the claimed invention, this specification will describe the operation of the present invention using the network block diagram of FIG. 1, the call flow diagrams of FIGS. 2 and 3, the ESP billing record shown in FIG. 4, the Exchange Message Interface (EMI) shown in FIG. 5; and the Record Description shown in FIG. 6. In the following description, the first digit of an element's reference number designates the figure where the element is located (e.g., 101 is located in FIG. 1).

With reference to FIG. 1, there is illustrated a block diagram of a well-known switching network configuration useful in describing the operation of the present invention. The drawing illustrates a Local Exchange Carrier (LEC) 101 and the Public Switched Telephone Network (PSTN) 100. The LEC 101 serves telephone station 103, and enables this station to complete calls to other stations (not shown) of the network in a well-known manner. The PSTN 100 also enables station 103 to access value-added services provided by Service Providers (SP) via equipment such as enhanced service platform (ESP) 170 connected to PSTN 100. The ESP 170, using In-band Equal Access Signaling Interface (IEASI) 179, may connect directly to the PSTN 100. The IEASI 179 is described in a Bellcore document entitled "Bell Operating Companies Notes on the Local Exchange Carrier Network," Section 6, March 1991.

The PSTN 100, illustratively, may comprise Originating Toll Switch (OTS) 110, Operator Services Position System (OSPS) 120, Access, TOPS, or Inter Tandem (Tandem) 130, billing system 140, routing network 150, Terminating Toll Switch (TTS)/Service Node (SN) 160, Service Management System (SMS) 180 and Recorded Announcement System (RCAN) 145. The structure and general operation of a Tandem and SMS is described in a Bellcore document entitled "Bell Operating Companies Notes on the Local Exchange Carrier Network", 1990, Section 14, which is incorporated herein by reference.

While LEC 101 is shown, illustratively, to connect via facility 102 to OTS 110 in FIG. 1, it may equivalently also connect directly to Tandem 130. Thus, OTS 110, and Tandem 130 are points in PSTN 100 which usually interface to other networks (e.g., LEC) or may directly connect to telephone stations (e.g., 103). Since some OTS 110, in our example, do not contain SMS 180 integrating software, they are not considered a common channel signaling (CCS) 189 switch. Consequently, some calls originated through OTS 110 must be directed to a toll switching office having CCS 189 software. The Tandem 130 is characterized as having a CCS 189 network connection to centralized data bases referred to as a SMS.

The operation of SMS 180 is also described, for example, in Bellcore Digest Technical References and Bellcore Guidelines for 800 Data Base. The changes in the operation of SMS 180 to perform the functions of the present invention are uploaded to the SMS by (NASC) 183 the National Assignment Service Center administrative clerk upon receipt of relational data base software update sent by the enhanced service provider 555-number national routing system (ESP 555-NXX) 182. The ESP 555-NXX NRS 182 is the centralized data base maintained for the purpose of assigning and administering access and routing codes integral to establishing and implementing said phantom-number bridging circuits as described in this specification.

The CCS 189 direct signaling facilities which link Tandem 130 and SMS 180 are, basically, a packet switching system for routing messages in accordance with their address data contents. CCS 189 network features are disclosed in the February, 1978 Bell System Technical Journal, (BSTJ) No. 2 and in W. B. Smith, et al., U.S. Pat. No. 3,624,613 of Nov. 30, 1971.

An illustrative OSPS 120 is described in the article written by N. X. DeLessio, et al.: "An Integrated Operator Services Capability for the 5ESS Switching System", International Switching Symposium, (Florence), Session 22C, Paper 3, pp. 1–5, May, 1984.

It should be noted that the structural details of LEC 101, toll office OTS 110 and the OSPS 120 form no part of the present invention and are only described herein to the extent necessary for an understanding of the invention.

LEC 101 may be, illustratively, a 5ESS (electronic switching system). The 5ESS is extensively described by K. E. Martersteck, et al., in AT&T Technical Journal, Volume 64, No. 6, part 2, pp. 1305–1564, July/August, 1985. The above-identified disclosures and the citations referred to therein may be consulted for a complete understanding of the construction and operations of a typical toll office.

The OTS 110, Tandem 130 and TTS/SN 160 may be, illustratively, an electronic program-controlled telephone system of the No. 4ESS design as described by A. E. Ritchie, et al., in the Bell System Technical Journal, (BSTJ), September, 1977, Volume 56, No. 7.

In accordance with the present invention, in-band signaling circuits are used for communication between the caller at telephone station 103 and the called location ESP 170, while Equal Access Signaling (EAS) protocol is used for communicating signaling and control messages including caller identification and billing information between network 100 and ESP 170. EAS protocol is described in a Bellcore document entitled "Bell Operating Companies Notes on the Local Exchange Carrier Network," 1990, section 6 which is incorporated herein by reference.

The SP may provide any of a variety of well-known services such as information database service, consulting service, marketing service, etc. on an ESP 170. The ESP 170 may typically include a processor 171 comprising Central Processor Unit (CPU) 172 and memory 173 including program memory 174 and data memory 175. The ESP 170 may, illustratively, be part of or an adjunct to a Private Branch Exchange (PBX), not shown. Program memory stores the program required to manage the various services provided by ESP 170 including the interactions with the caller. The data memory 175, illustratively shown as part of processor 171, contains an operational billing database as well as the information databases required to provide the various services provided by ESP 170. Alternatively, data memory 175 may be part of a data base system (not shown) which is accessible by processor 171. Announcement circuit 176 provides the various announcements used by ESP 170 to output the menu to the caller and to interact with the caller. The touch-tone receiver 177 enables the detection of user touch tone inputs in response to voice announcement inquiries outputted to the user by ESP 170. The speech recognizer 178 enables ESP 170 to determine a caller voice response to system inquiries.

In accordance with the present invention, the Alternate Billing Service/Line Information Data Base (ABS/LIDB) 190 is accessed in real-time (i.e., during receipt of billing and called number information) to validate the ESP's ability to bill the calling number or terminate unbillable calls.

The Call Detail Record (CDR) 191 which is present in every key system or PBX, the Reformat to EMI Billing Records 192, and the Call Billing Records 193 form no part of the present invention and are only described herein to the extent necessary for an understanding of the invention.

DETAILED DESCRIPTION

Figure 5F:
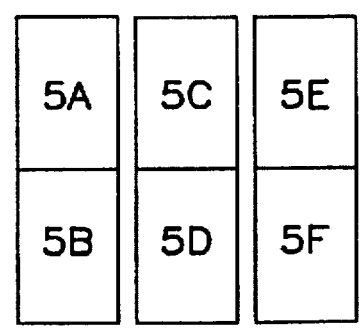
FIG. 5 shows SR STS-000320, a typical Exchange Message Interface (EMI) billing record used to bill callers for calls made over the PSTN network.

In accordance with the method and apparatus of the present invention, when a customer (e.g., caller at station 103, FIG. 1) dials a value-added call to an SP number, the call is routed to an ESP 170 location and any SP-specified charges incurred during the call are separately determined for each call and included in the EMI billing record 192, FIG. 5. The SP-specified charges are incurred for value-added services provided by the SP during the call. The SP-specified charges are determined using SP-designated call billing parameters which may change substantially in real time by the caller's selection.

The present invention enables the SP at ESP 170 to selectively specify call billing parameters which specify the caller charges. These SP-specified caller charges are transported on a call-by-call basis from ESP 170 via modem or tape delivery to the billing system 140, as illustrated in FIG. 1. The billing system 140 recognizes and processes the SP-specified charges for inclusion in the network bill to the customer (caller), as shown as "telephone bill sent by mail" in FIG. 1.

Figure 2B:
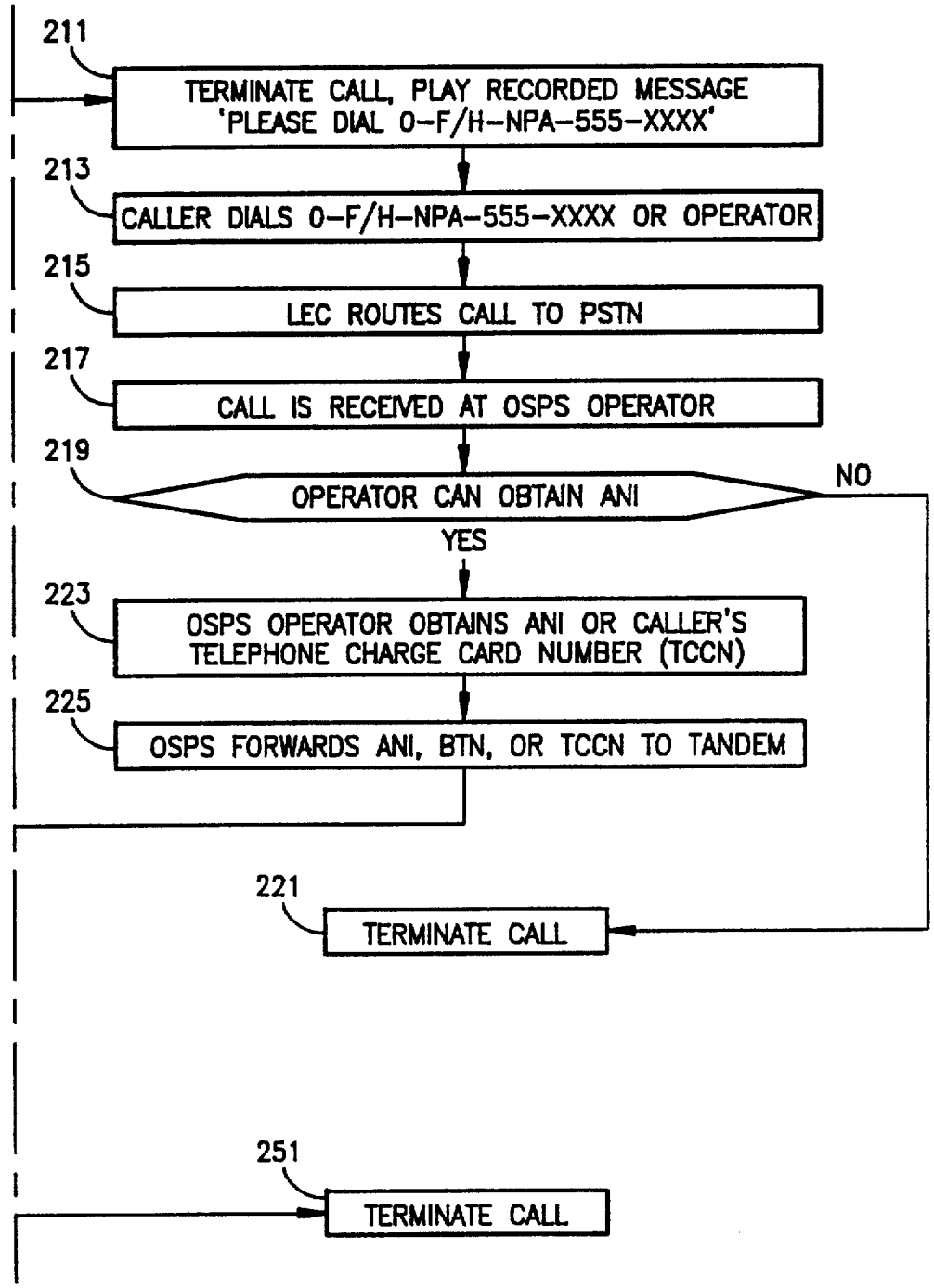
FIG. 2 shows a call flow diagram of the operation of the billing system and the PSTN in accordance with the operation of the present invention.
Figure 3A:
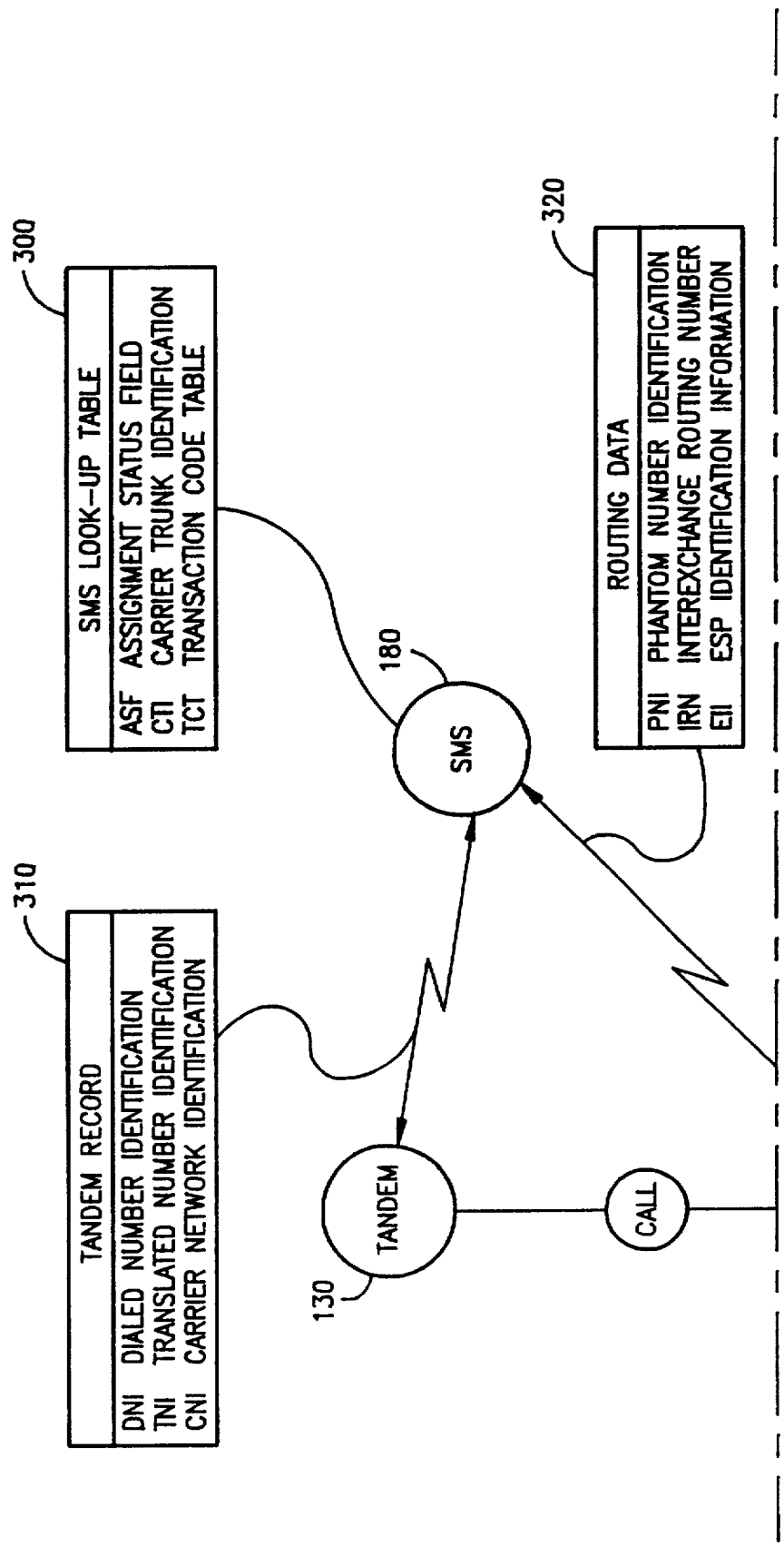
FIG. 3 describes the mechanism by which the end-user dialed number is translated by PSTN carriers and delivered to ESPs.
Figure 3B:
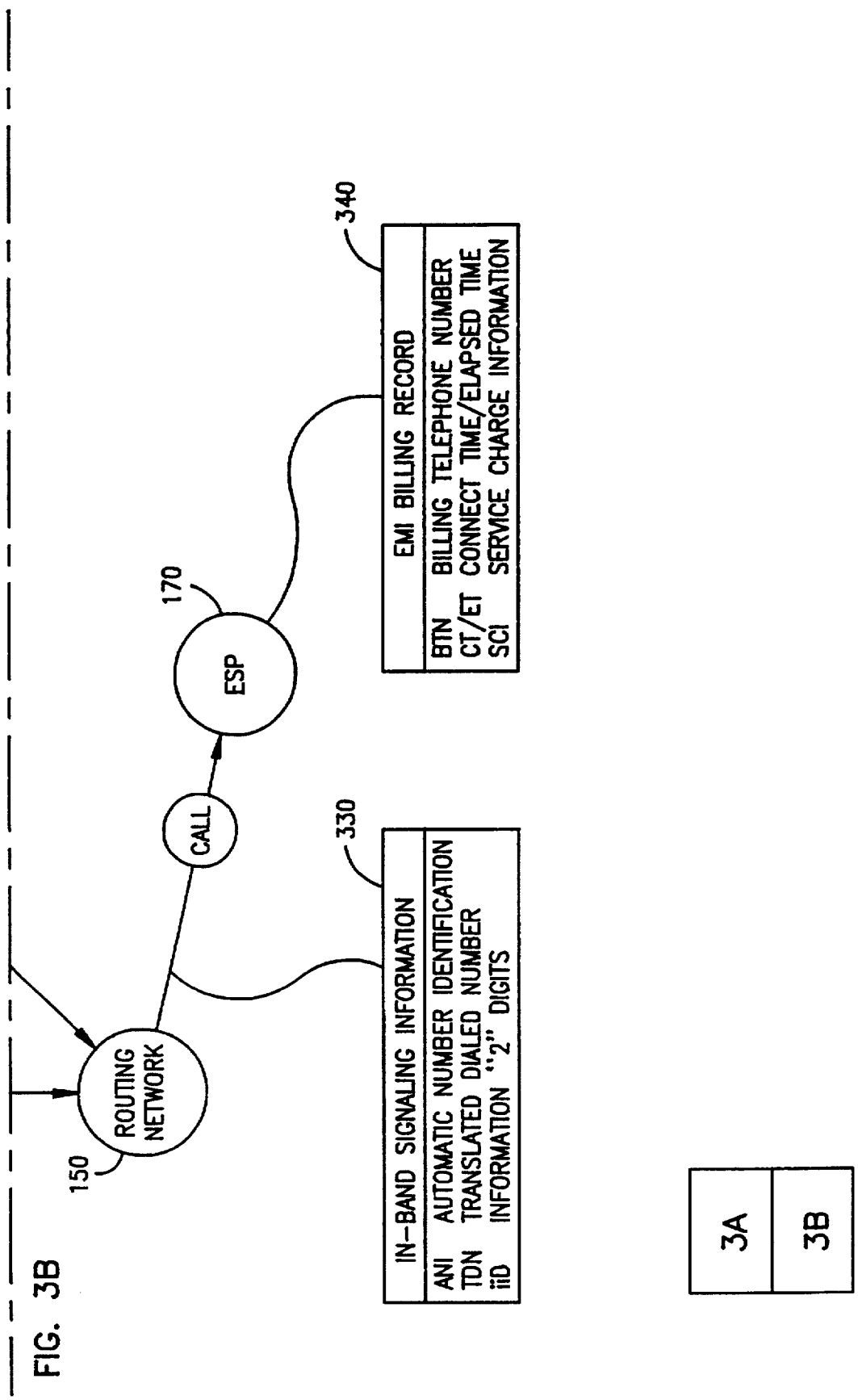

With joint reference to FIGS. 1 and 2, the inventive method and apparatus for the billing of a value-added communication call originated by a caller at station 103 and terminating at ESP 170 is described in more detail. One illustrative value-added communication service which the present invention may be adapted and utilized with, for example, is a service known as 555-Fax-It facsimile telecommunication service.

Note, while the present invention has been described for value-added service calls using 555 numbers, it should be understood that it may also be used with other telecommunication services.

Assume initially, in Step 201 shown in FIG. 2, that a caller at station 103 dials 555-XXXX (or local dialing plan) e.g., 1-(F/H-NPA) 555-XXXX where each of the X digits is any number between 0–9. F/H-NPA is the foreign or home numbering plan area. The caller may have been prompted to call a 555 number based on seeing or hearing an advertisement in various media.

In step 203, LEC 101 routes the call to PSTN 100 where it is sent to OTS 110. It should be noted that the originating LEC 101 may be either an Equal Access End Office (EAEO) or a NonConforming Office (NCO). An EAEO location has Automatic Number Identification (ANI) capability which enables the caller's number to be provided to OTS 110. The ANI number is required for billing the calling party for any calling charges and any value-added service charges.

If the caller's LEC 101 is an NCO location, ANI is not available and, hence, the caller's number must be obtained by using the assistance of an OSPS 120 operator.

The OTS 110 recognizes the dialed number as a value-added service number (e.g., a 555-Fax-It service call) and routes the call, in step 231, to Tandem 130 for further call processing. Tandem 130 determines from the incoming trunk group identity that the call is a direct-dialed call and not an operator-assisted call. Note, in an alternate embodiment, both direct-dialed (1-555 calls) and operator-assisted calls (0-555 calls) may be received at the Tandem 130, via OTS 110, without OSPS 120 intervention. In such a case, the Tandem 130 forwards calls to the OSPS 120. It should be noted that the operation of the present invention is the same for both of these embodiments.

In step 209, Tandem 130 determines whether an ANI number is received from OTS 110, if so, call processing continues in step 233; if not, the call is blocked or terminated with an appropriate message in step 211. An illustrative message (from announcement system 145) in step 211 informs the caller that "your call cannot be completed as dialed. Please redial your call as 0-F/H-NPA-555-XXXX", or a similar recorded announcement.

For direct-dialed calls which are blocked (i.e., those without ANI numbers) as well as those calls for which the caller desires operator assistance, the caller dials 0-F/H-NPA-555-XXXX (step 213). In this instance, the call bypasses step 211, whether or not ANI is present. LEC 101 identifies the call as a local access transport area network (Intra-LATA) call and routes the call to PSTN 100, in step 15. In step 217, the call is sent by LEC 101 to an OSPS 120 for operator assistance. The OSPS 120 identifies the call as a value-added service call, in step 219, by interpreting the dialed number. If the call is not a value-added call, then it is handled, in step 221, in the appropriate manner by OSPS 120. That is, the call may be appropriately completed or blocked.

If the call is recognized as a value-added call, OSPS 120 may automatically collect the caller's telephone number or telephone charge card number (billing telephone number, BTN) or may connect an operator to collect the caller's number. The caller's telephone number (ANI) or telephone charge card number will be used to bill charges incurred by the caller during the call.

Under the automatic card number collection procedure, in step 223, OSPS 120 provides a "bong" tone to the caller, and collects the telephone charge card number. In step 225, OSPS 120 forwards the telephone charge card number to the Tandem 130 for call processing. Note, some telephone charge cards use ANI plus a PIN (4-digit personal identification code) as the charge card validation. If the caller enters digits which correspond to the caller's Telephone Charge Card (TCC), these numbers are forwarded to the Tandem 130 for further call processing. Validation of these TCC numbers are performed within ABS/LIDB 190. If the caller does not enter the digits, the call is connected to an operator who obtains the caller's number (ANI) and/or TCC number (i.e., BTN), which is forwarded to the Tandem 130 for further call processing.

In step 233, Tandem 130 sends a query, a well-known process and query format, which includes the 7-digit dialed number (called party) and the ANI and/or billing number, over the CCS network 189 to SMS 180. The CCS network 189 routes the query, based on the dialed number, to the appropriate Tandem-accessible data base within the SMS 180.

In step 239, SMS 180 uses the dialed number (DN) (555-XXXX) to access the Tandem side of the SMS data base to identify the Phantom Routing Number assigned to the dialed number and returns the Phantom Number to Tandem 130. In step 241, Tandem 130 transfers the call to the Routing Network 150 using the Phantom Number. The SMS 180 is a data base used in the PSTN by connecting carriers to support the 800-number data base and its requirement for portability. The function of the data base is to translate 800 dialed numbers into network carrier address and routing address. Use of the SMS data base is documented in a document entitled "Guidelines for 800 Data Base," previously referenced.

In step 243, upon receiving the call to the Phantom Number, the Routing Network 150 sends a query, which includes the Phantom Number and the ANI, via the CCS 189 to the SMS 180 which uses the Phantom Number to access the IXC side of the SMS data base to identify the TTS 160 to which the call is to be routed. In step 245, Routing Network 150 routes the call to the TTS/SN 160 serving the ESP location (e.g., ESP 170 in FIG. 1). In step 247 TTS 160 connects ESP 170 to the Routing Network. Routing Network 150 sends a signaling message to the ESP 170, including the caller's identification, and translated IXC routing number. This information is sent over the Inband Equal Access Signaling Interface (IEASI) 179 with caller ID/billing information and DN. A caller's ID is defined herein to mean a network call identification number (which can be translated into the caller's station number), caller's station number, caller's billing number, a subaccount indicator (caller's subaccount number) or other identification which ensures that the proper party will be billed for the call. In response to the receipt of the ANI message, ESP 170 sends a response back to TTS 160 to indicate that the call identification information has been received (e.g., wink).

In step 249, ESP 170 validates caller's ANI in real-time through ABS/LIDB 190. In step 250, ESP 170 determines if all parameters are met to qualify the call as billable. In step 251, if the call is determined by ESP 170 to be unbillable, ESP 170 terminates the call. In step 260, ESP 170 collects the IXC routing number, caller ID and billing information, then outputs a service menu to the caller and signals answer supervision back through PSTN 100. When answer supervision is returned by the ESP 170, the Tandem 130 will start timing the call. Note, ESP 170 may also time the call connection for its own purposes.

In step 261, ESP 170 may offer caller certain options through an attendant or announcement circuit 176 at the ESP 170 by sending a greeting to the user and requesting that selections be made from a menu of various ESP 170 services available to the user. If ESP 170 uses an attendant, the attendant would recite the menu and collect the responses. If ESP 170 is automated, the menu selection process may use an interactive voice response format which enables the user to enter selections, using touch-tone entries at station 103, in response to voice queries from the ESP 170. The touch-tone receiver 177 would receive the user's selection. Alternatively, the ESP 170 may include speech recognition equipment 178 which can determine the user selections. Moreover, if the user station 103 includes a video display terminal or computer, a text message can be outputted to the caller. Additionally, if the user station 103 includes a facsimile machine, data in facsimile form can be sent thereto from ESP 170.

In step 262, after the attendant, touch-tone receiver 177 or speech recognizer 178 collects the caller's response, ESP 170 records appropriate billing parameters for the call. The ESP 170 provides the caller with the desired information service requested by connecting the caller to an information consultant or by outputting information directly from a database (in voice, text or fax form). Note, according to another aspect of the invention, the caller may, during the call, request a connection to more than one ESP-provided feature or service. In such a scenario, the ESP 170 may bill the caller at a rate which is appropriate for each of the requested services, in addition to the call-rate charged up to that point.

The call rate information would include the actual charges incurred by the caller, based on the caller-selected services provided by the ESP 170. The rate information may also be specified using a variety of call length and call rate parameter combinations. The field description of document SR-STS-000320, billing record are shown in FIG. 5.

The ESP 170 may specify the call rate to vary with the time of day, day of week, and day of year. FIG. 4 shows the ESP Billing Record. The billing information may identify the type of call being billed 423 (service name/text code) which may vary in accordance with the selection response (touch tone digits or voice) of services by the caller. Note, if the caller selects more than one ESP-provided service, then the billing record of FIG. 4 may require separate fields 427 (type of additional charge) and 428 (amount of additional charge) to store billing parameters for each service or feature selected by the caller.

The ESP 170 may also vary charges depending on the caller's geographic area. The ESP 170 may also permit the caller to directly specify billing charge, for example, where the ESP is a fund raiser and the user wants to make a donation to a charitable organization. Additionally, the ESP-170 may also provide a textual descriptor (text describing the charges incurred by the caller) as part of the billing information.

We again return to the call flow description of FIG. 2. In step 262, when the call is terminated the ESP 170 creates an EMI billing record shown in 340 of FIG. 5. FIG. 5 illustrates a typical EMI billing record structure and typical parameters therein which may be utilized for billing for an ESP-provided value-added service (e.g., 555-Fax-It service). Some of the various parameters, 422 and 431, of the EMI structure are obtained from the network message of FIG. 3 as well as from the IEASI information associated with the value-added call. The significant billing parameters in the EMI record are the Billing Telephone Number (BTN) 429, Connect Time (CT) 422, Elapsed Time (ET) 432, and Service Name/Text Code (SN/TC) 423. The CT and the ET are the values determined by ESP 170 in step 262.

In step 263, Billing System 140 is sent the caller's combined value-added service bills in the form of an EMI billing record by modem or magnetic tape in a well-known manner. For calls originated through the originating toll switch 110 or through the OSPS 120, a caller's value-added service charges may appear on the telephone bill to station 103, on a third-party telephone bill, or on a telephone charge card bill. The caller's bill may also include the textual descriptors provided by the ESP 170 as part of the billing information. Alternatively, and not a part of this invention, ESP 170 may bill caller for delivered value-added services on a commercial credit card.

The billing system 140 processes the EMI records to create aggregate and detailed call volumes and traffic parameters (e.g., geographic, time of day, calls blocked, etc.). The billing system also calculates the aggregate and detailed breakdown of revenues either payable to or receivable from the ESP 170. The detailed EMI billing records also contain subaccount indicators provided by the SP on a per call basis. This allows the SP to bill their clients or process the billing records in an appropriate manner.

The present invention may also be utilized to enable the ESP 170 to bill the caller for goods purchased over the telephone from the SP in addition to services provided by the SP. Furthermore, the invention may be utilized to accept caller-specified charges (e.g., donation made to a charity sponsor) which are entered by the caller, verified by the ESP 170, and incorporated in the EMI record.

The ESP 170 can accept rate changes in real time. In one example, assume that the ESP 170 is in the business of providing expert consultation services. When the caller makes a call and selects the SP's premium services, the caller may not wish to hear an answering machine. To better serve their clients, the SP might wish to set the service rate at a lesser amount when the experts are not available (making it, in effect, a minimum-rate call to the caller). When the experts are available, the SP might provide a means for the caller to select the premium expert rate. This improves the quality of the service to both caller and ESP 170.

In a second example, assume the SP is advertising their service using television media. If the SP is not sure what price the products will bear, the SP can run several ads offering different rates and determine the demand for the product at various price-points. This allows the SP to conduct "test marketing" of their goods and services.

The SP can specify different rates in ads ran in different geographical locations. This allows the SP to price their products differently in different regions. In doing so, they can stimulate their products in new regions of the country.

What has been described is merely illustrative of the application of the principles of the present invention. Other arrangements and methods can be implemented by those skilled in the art without departing from the spirit and scope of the appended claims.

What is claimed is:

1. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

dialing a specific 555-XXXX number corresponding to a specific enhanced service provider from a telephone having a caller telephone number;

capturing the caller telephone number;

sending a query to a service management system data base residing in the public switched telephone network;

identifying a phantom routing number assigned to said specific enhanced service provider;

transferring the call to a routing network using the phantom routing number;

sending a query from the routing network to the service management system data base, the query including the phantom routing number and the caller telephone number;

identifying a terminating toll switch servicing said specific enhanced services provider;

routing the call to the identified terminating toll switch servicing said specific enhanced service provider;

connecting said specific enhanced service provider to the routing network;

sending call identification information to said specific enhanced service provider, including the caller telephone number and the phantom routing number;

determining if the call is billable and validating the caller telephone number via an alternate billing service/line information data base residing in the public switched telephone network;

presenting a menu of items and billing rates to the caller;

selecting one of the items and the corresponding billing rate; and sending a billing record to a billing and collection system.

2. The method of claim 1 wherein said local-dialed end of said public switched telephone network is bridged to said long distance-dialed end of said network by a phantom-number circuit comprising the steps of:

installing a ten-digit number within the service management system data base software of said public switched telephone network, which said ten-digit number is neither connected nor published, thereby becoming said phantom number of said phantom number circuit;

installing database software pointers relating said seven-digit local-dialed number to said phantom number with the local exchange carrier number look-up side of said data base; and installing data base software pointers relating said ten-digit national-dialed number to said phantom number within the interexchange carrier number look-up side of said data base.

3. The method of claim 2 wherein said phantom number and said software pointers are installed within said data base comprising the steps of:

computer-generating a relational data base record pointing said seven-digit local-dialed number to said phantom number;

computer-generating a relational data base record pointing said ten-digit national-dialed number to said phantom number; and transmitting said relational data base records by computer modem, magnetic media or other appropriate method of transmission to the data entry port of said service administration system.

4. The method of claim 1 wherein said caller identification and billing information is communicated to the enhanced service provider by in-band signaling circuits using a local exchange carrier routing message and a toll carrier routing message.

5. The method of claim 4 comprising the steps of:

enabling said enhanced service provider to exercise the option of denying an unbillable call requesting said enhanced service prior to supplying said service to said caller;

enabling the caller to specify one or more services to be provided during said call; and enabling said service provider to render a separate service charge for each of said one or more services provided to the caller.

6. The method of claim 4 wherein said circuits facilitate receipt of requests for multiple services at various prices and receipt of separate billing information for each service delivered.

7. The method of claim 1 further comprising the step of compiling information for purposes of billing the caller for said incurred charges by use of an exchange message interface billing record.

8. The method of claim 4 wherein said billing information includes information specifying the type of service provided to the caller during said call.

9. The method of claim 1 wherein said method includes the step of creating a separate billing record specifying said billing information for each connection to the called location.

10. The method of claim 8 wherein said billing information provided can be used to create textual descriptors which can be included as part of the billing record.

11. The method of claim 1 wherein said method includes the step of enabling the caller to specify one or more billing parameters during said call to be used to determine said billing information.

12. The method of claim 10 wherein said caller-specified billing parameters include a billing number for billing said charges incurred by the caller.

13. The method of claim 12 wherein said billing number is a number other than the call-originating number.

14. The method of claim 1 wherein said billing information includes a calling charge rate per fixed time period.

15. The method of claim 1 wherein said billing information includes an initial period charge parameter and an additional period charge parameter.

16. The method of claim 1 wherein said billing information includes a fixed charge per call.

17. The method of claim 1 wherein said billing information identifies the type of call to be billed.

18. The method of claim 1 wherein said billing information includes the total charge incurred by the caller during said call.

19. A method as in claim 1 including the step of reformatting data to bill a caller for charges incurred during a call made over disparate networks within the public switched telephone network to a called location comprising use of an exchange message interface disposed within said network.

20. The method of claim 19 further comprising the step of using said exchange message interface to produce an enhanced service provider billing record.

21. Apparatus, for sending billing information to the public switched telephone network to be billed to a caller for charges incurred by the caller during a call made over said network, said apparatus comprising:

telephone means for dialing a specific 555-XXXX number corresponding to a specific enhanced service provider, said telephone means having a caller telephone number, said telephone means being connected to the public switched telephone network;

recording means resident in said network for capturing the caller telephone number;

first querying means resident in said network for sending a query to a service management system data base;

said service management system data base including means for identifying a phantom routing number assigned to said specific enhanced service provider;

first switching means resident in said network for transferring the call to a routing circuit using the phantom routing number;

second querying means resident in said network for sending a query from the routing circuit to the service management system data base, the query including the phantom routing number and the caller telephone number;

identification means resident in said service management system data base for identifying a terminating toll switch servicing said specific enhanced services provider;

second switching means in said network for routing the call to the identified terminating toll switch servicing said specific enhanced service provider;

connecting means in said network for connecting said specific enhanced service provider to the routing circuit;

transmitting means for sending call identification information to said specific enhanced service provider, including the caller telephone number and the phantom routing number;

decision means resident in said enhanced service provider for determining if the call is billable and validating the caller telephone number via an alternate billing service/line information data base;

menu means at said enhanced service provider for presenting a menu of items and billing rates to the caller;

selection means for selecting one of the items and the corresponding billing rate; and billing means at said service provider for sending a billing record to a billing and collection system.

22. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

dialing a specific 555-XXXX number from a caller telephone, where each of the X digits is a number between 0 and 9, said specific 555-XXXX number corresponding to a specific enhanced service provider;

capturing the caller telephone number;

sending a query to a service management system data base;

identifying a phantom routing number assigned to said specific enhanced service provider;

transferring the call to a routing network using the phantom routing number;

sending a query from the routing network to the service management system data base, the query including the phantom routing number and the caller telephone number;

identifying a terminating toll switch servicing said specific enhanced services provider;

routing the call to the identified terminating toll switch servicing said specific enhanced service provider;

connecting said specific enhanced service provider to the routing network;

sending call identification information to said specific enhanced service provider, including the caller telephone number and the phantom routing number;

determining if the call is billable and validating the caller telephone number via an alternate billing service/line information data base;

presenting a menu of items and billing rates to the caller;

selecting one of the items and the corresponding billing rate; and sending a billing record to a billing and collection system.

23. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

dialing at a caller telephone a specific 555-XXXX number, where each of the X digits is a number between 0 and 9, said specific 555-XXXX number corresponding to a specific enhanced service provider;

determining at a tandem switch whether the caller telephone number is received;

sending a query from the tandem switch via a common channel signalling network to a service management system data base;

identifying a phantom routing number assigned to said specific enhanced service provider;

returning the phantom routing number to the tandem switch;

transferring the call to a routing network using the phantom routing number;

sending a query from the routing network via the common channel signalling system to the service management system data base, the query including the phantom routing number and the caller telephone number;

identifying a terminating toll switch servicing said specific enhanced services provider;

routing the call to the identified terminating toll switch servicing said specific enhanced service provider;

connecting said specific enhanced service provider to the routing network;

sending call identification information to said specific enhanced service provider, including the caller telephone number and the phantom routing number;

sending a response back to the terminating toll switch from said specific enhanced service provider indicating that the call identification information has been received;

determining if the call is billable and validating the caller telephone number via an alternate billing service/line information data base;

presenting a menu of items and billing rates to the caller;

selecting one of the items and the corresponding billing rate; and sending a billing record to a billing and collection system.

24. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

dialing at a caller telephone a specific 555-XXXX number, where each of the X digits is a number between 0 and 9, said specific 555-XXXX number corresponding to a specific enhanced service provider;

determining at a tandem switch whether the caller telephone number is received;

sending a query from the tandem switch via a common channel signalling network to a service management system data base;

identifying a phantom routing number assigned to said specific enhanced service provider;

returning the phantom routing number to the tandem switch;

transferring the call to a routing network using the phantom routing number;

sending a query from the routing network via the common channel signalling system to the service management system data base, the query including the phantom routing number and the caller telephone number;

identifying a terminating toll switch servicing said specific enhanced services provider;

routing the call to the identified terminating toll switch servicing said specific enhanced service provider;

connecting said specific enhanced service provider to the routing network;

sending call identification information to said specific enhanced service provider, including the caller telephone number and the phantom routing number;

sending a response back to the terminating toll switch from said specific enhanced service provider indicating that the call identification information has been received;

validating the caller telephone number via an alternate billing service/line information data base;

determining if the call is billable;

recording the phantom routing number, the caller telephone number and billing information;

presenting a menu of items and billing rates to the caller;

sending an answer supervision signal to the tandem switch;

timing the call at the tandem switch upon receipt of the answer supervision signal;

selecting one of the items and the corresponding billing rate; and sending a billing record to a billing and collection system.

25. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

dialing at a caller telephone a specific 555-XXXX number, where each of the X digits is a number between 0 and 9, said specific 555-XXXX number corresponding to a specific enhanced service provider;

determining at a tandem switch whether the caller telephone number is received, if so, the call processing continues, if not, the call is blocked or terminated;

sending a query from the tandem switch via a common channel signalling network to a service management system data base;

identifying a phantom routing number assigned to said specific enhanced service provider;

returning the phantom routing number to the tandem switch;

transferring the call to a routing network using the phantom routing number;

sending a query from the routing network via the common channel signalling system to the service management system data base, the query including the phantom routing number and the caller telephone number;

identifying a terminating toll switch to which the call is to be routed;

routing the call to the identified terminating toll switch servicing said specific enhanced service provider;

connecting said specific enhanced service provider to the routing network;

sending call identification information to said specific enhanced service provider, including the caller telephone number and the phantom routing number;

sending a response back to the terminating toll switch from said specific enhanced service provider indicating that the call identification information has been received;

validating the caller telephone number via an alternate billing service/line information data base;

determining if the call is billable, if not, blocking or terminating the call, if so, continuing call processing;

collecting and recording the phantom routing number, the caller telephone number and billing information;

presenting a menu of items and billing rates to the caller;

sending an answer supervision signal to the tandem switch;

timing the call at the tandem switch upon receipt of the answer supervision signal;

selecting one of the items and the corresponding billing rate;

terminating the call;

creating a billing record; and sending the billing record to a billing and collection system.

26. In a telephone sub-circuit for transmitting calls, caller information and billing information to enhanced service providers delivering value-added services to callers originating service requests by dialing seven-digit numbers from the local-dialed end of the public switched telephone network, that must be completed at the disparate long distance-dialed end of said network, said local-dialed end of said public switched telephone network being bridged to said long distance-dialed end of said network by a phantom-number bridging circuit, the method comprising the following steps:

prompting a caller, by means of advertising in advertising media, to dial a specific 555 number to obtain services from an enhanced service provider, said caller having a specific telephone number;

dialing a specific 555-XXXX number, where each of the X digits is a number between 0 and 9;

routing the call via a local exchange carrier to an originating toll switch;

capturing the caller's number by means of automatic number identification equipment;

routing the call from the originating toll switch to a tandem switch;

determining whether an automatic number identification number is received from the originating toll switch, if so, the call processing continues, if not, the call is blocked or terminated;

sending a query from the tandem switch via a common channel signalling network to a service management system data base;

identifying a phantom routing number assigned to the dialed number;

returning the phantom routing number to the tandem switch;

transferring the call to a routing network using the phantom routing number;

sending a query from the routing network via the common channel signalling system to the service management system data base, the query including the phantom routing number and the automatic number identification number;

identifying a terminating toll switch to which the call is to be routed;

routing the call to the identified terminating toll switch servicing the enhanced service provider location;

connecting the enhanced service provider to the routing network;

sending call identification information to the enhanced service provider, including the automatic number identification number and the phantom routing number;

sending a response back to the terminating toll switch from the enhanced service provider indicating that the call identification information has been received;

validating the caller's automatic number identification number via an alternate billing service/line information data base;

determining if the call is billable, if not, blocking or terminating the call, if so, continuing call processing;

collecting and recording the phantom routing number, the caller's automatic number identification number and billing information;

presenting a menu of items and billing rates to the caller;

sending an answer supervision signal to the tandem switch;

timing the call at the tandem switch upon receipt of the answer supervision signal;

selecting one of the items and the corresponding billing rate;

terminating the call;

creating a billing record; and sending the billing record to a billing and collection system.

* * * * *